United States Patent [19]
Gehring

[11] Patent Number: 5,432,301
[45] Date of Patent: Jul. 11, 1995

[54] CLAMP FOR GROUND CABLE OR SHIELDED CABLE

[75] Inventor: Peter Gehring, Simonswald, Germany

[73] Assignee: Anton Hummel Verwaltungs GmbH, Waldkirch, Germany

[21] Appl. No.: 151,213

[22] Filed: Nov. 12, 1993

[30] Foreign Application Priority Data

Nov. 14, 1992 [DE] Germany .............. 42 38 517.2

[51] Int. Cl.⁶ ........................................ H02G 15/06
[52] U.S. Cl. ................................ 174/78; 174/74 R; 174/88 C; 174/88 S
[58] Field of Search ............. 174/78, 74 R, 88 C, 174/88 S, 90

[56] References Cited

U.S. PATENT DOCUMENTS

| | | | |
|---|---|---|---|
| 3,280,246 | 10/1966 | Lawson et al. | 174/88 C |
| 3,448,430 | 6/1969 | Kelly . | |
| 3,465,092 | 9/1969 | Schwartz | 174/78 |
| 3,833,754 | 9/1974 | Philibert | 174/78 |
| 3,985,950 | 10/1976 | Maltz | 174/88 C |
| 4,328,392 | 5/1982 | Kutnyak | 178/78 |
| 4,346,428 | 8/1982 | Gale | 174/78 |
| 4,739,126 | 4/1988 | Gutter et al. | 174/78 |
| 4,810,832 | 5/1989 | Spinner et al. | 174/78 |
| 5,217,392 | 6/1993 | Hosler, Sr. | 174/88 C |
| 5,266,742 | 11/1993 | Heier et al. | 174/74 R |

FOREIGN PATENT DOCUMENTS

| | | | |
|---|---|---|---|
| 2371077 | 11/1976 | France . | |
| 2517132 | 11/1981 | France . | |
| 592667 | 2/1934 | Germany . | |
| 1490798 | 6/1969 | Germany | 174/74 R |
| 2348882 | 4/1975 | Germany . | |
| 2702610 | 9/1987 | Germany . | |
| 3640832 | 6/1988 | Germany . | |
| 2060278 | 4/1981 | United Kingdom . | |

Primary Examiner—Morris H. Nimmo
Attorney, Agent, or Firm—Darby & Darby

[57] ABSTRACT

An electrical cable has ground wires for grounding or shielding the interior of the cable. Segments of the wires project from the cable and are uninsulated. A clamp for fixing the cable and connecting the ground wires to ground includes a plastic insulating sleeve which is slipped over the cable. The sleeve has an axial extension at one end and clamping fingers at the other end. The extension is provided with a resilient, generally annular circumferential projection and the sleeve is placed on the cable with the extension adjacent the uninsulated wire segments. The latter are bent onto the extension so as to overlie the projection. The extension and its overlying wire segments are inserted in an externally threaded, electrically conductive clamping collar. The internal diameter of that part of the clamping collar which surrounds the projection and its overlying wire segments is smaller than the outer diameter of the projection and its overlying wire segments. Thus, the projection is compressed upon insertion of the extension in the clamping collar and urges the wire segments into firm electrical contact with the conductive clamping collar. An internally threaded backing collar is slid over the clamping fingers and brought into mesh with the clamping collar. The backing collar contacts the free ends of the clamping fingers and biases the fingers against the cable as the backing collar and clamping collar are tightened.

36 Claims, 5 Drawing Sheets

FIG. 1
FIG. 2
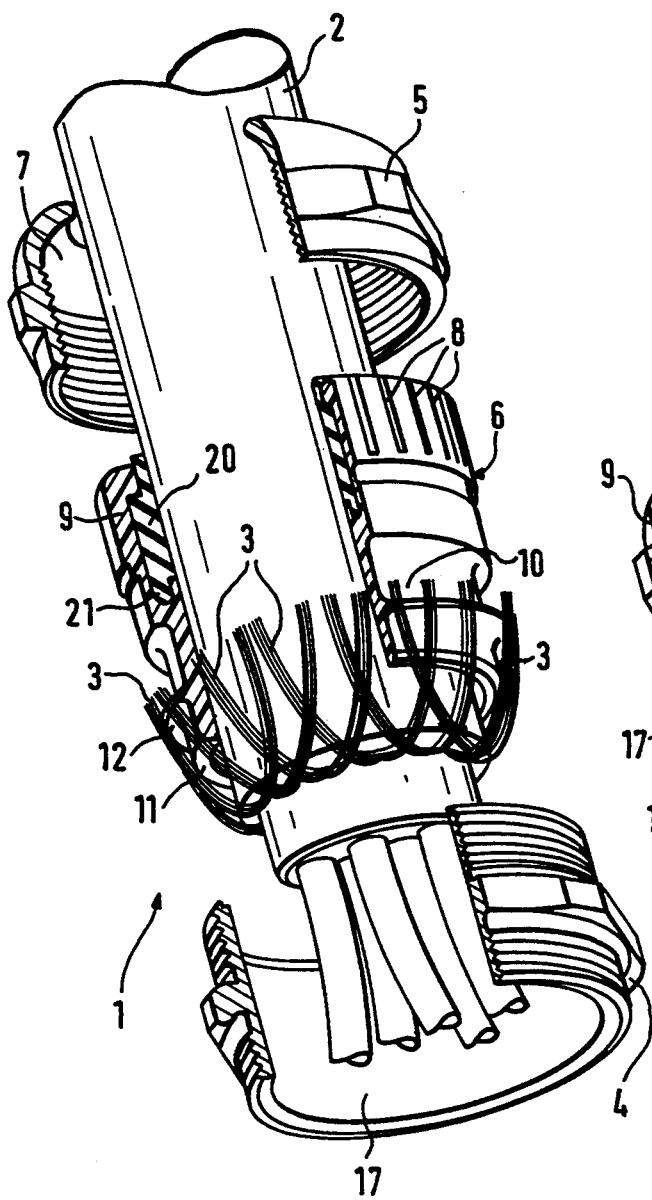
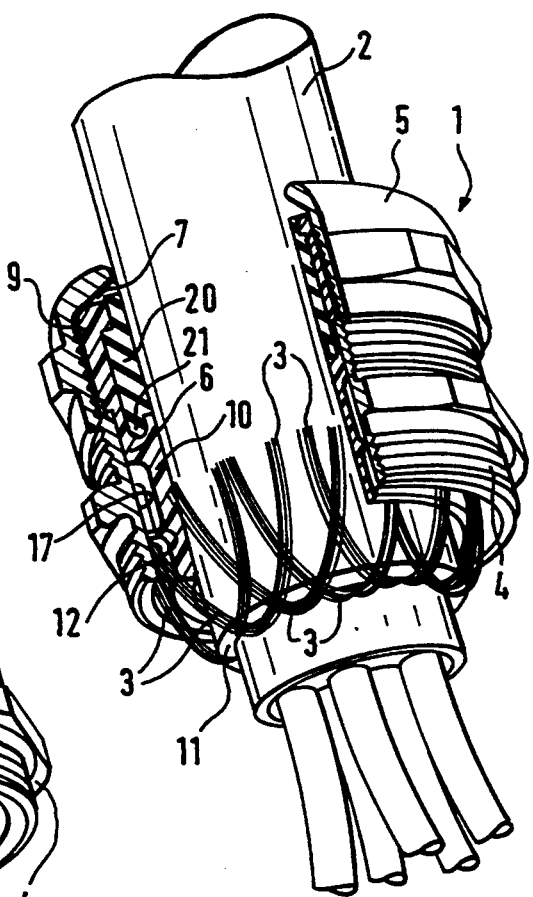

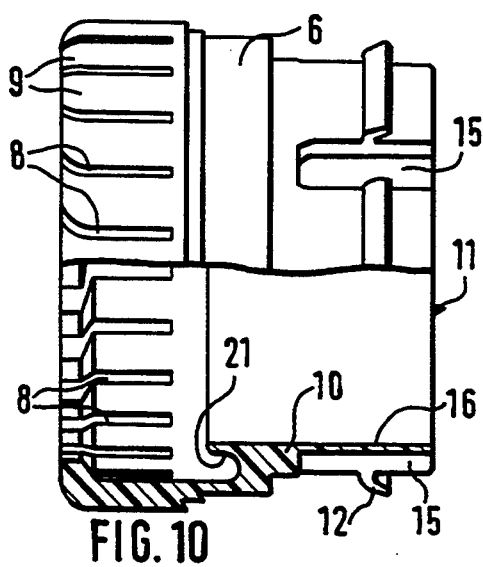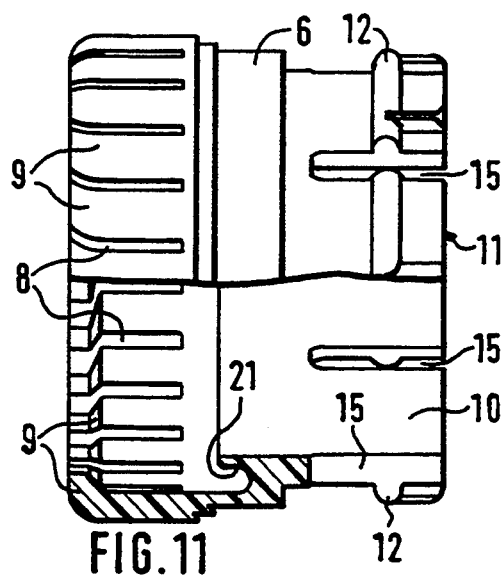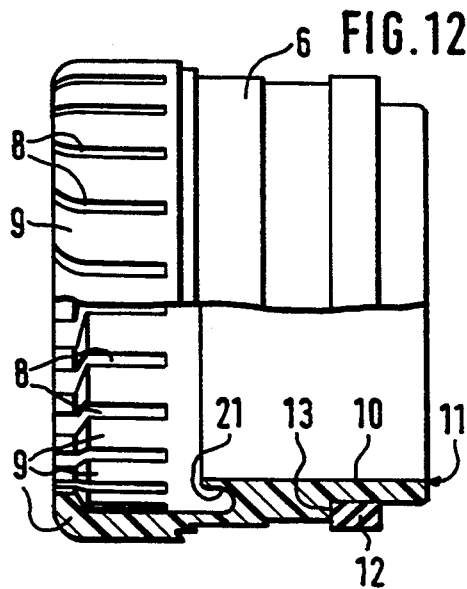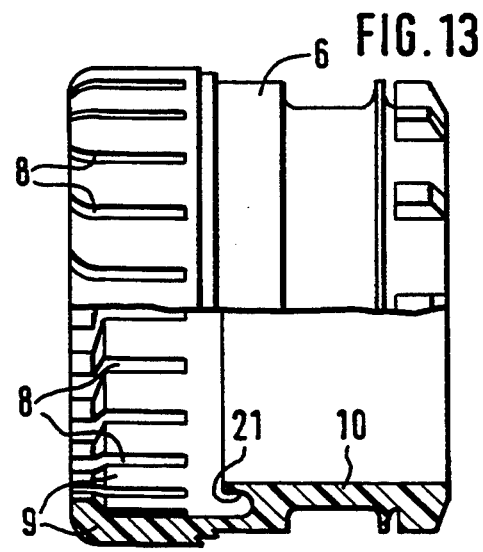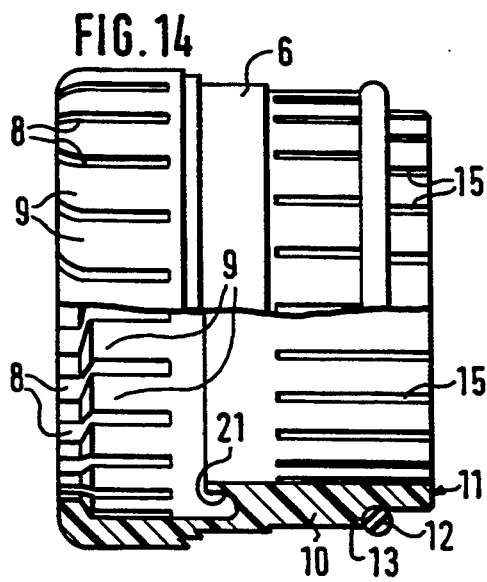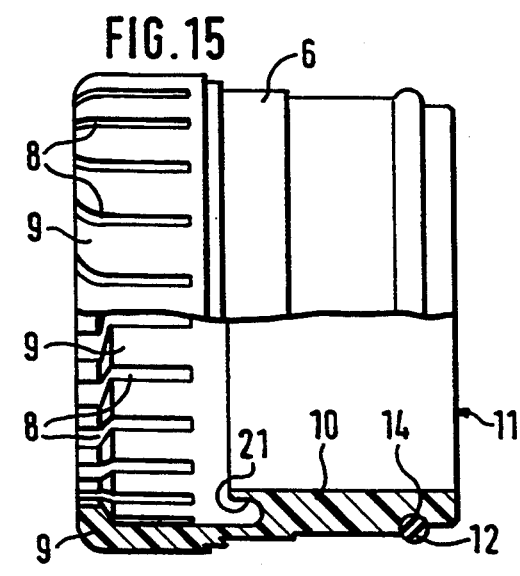

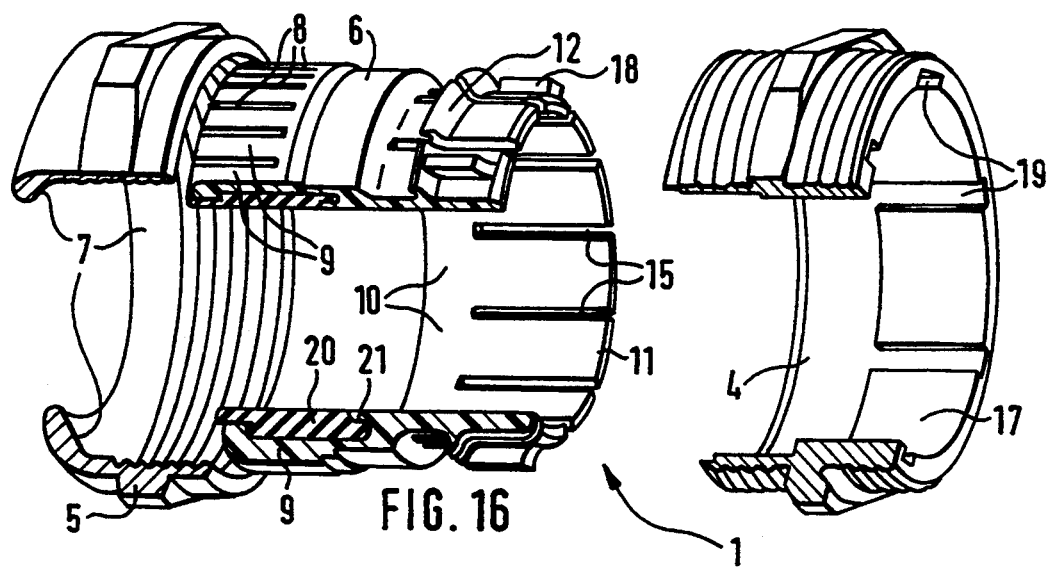
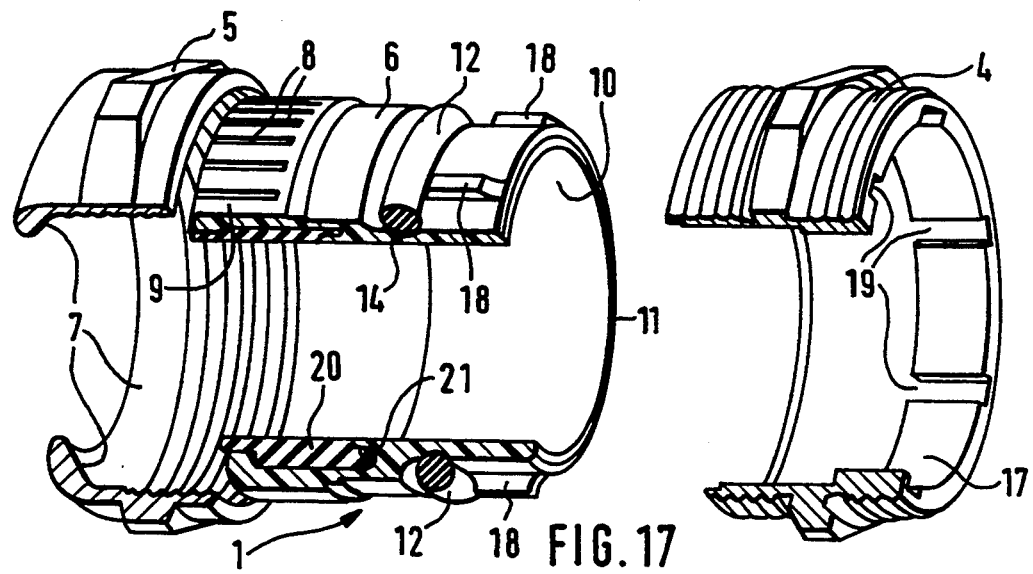
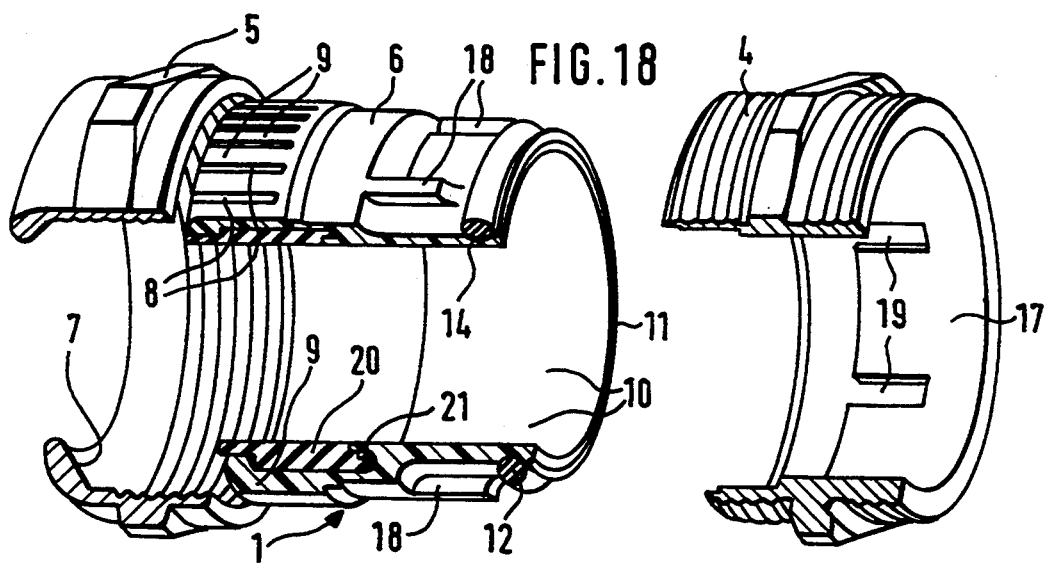

CLAMP FOR GROUND CABLE OR SHIELDED CABLE

FIELD OF THE INVENTION

The invention relates to a clamp for an electrical cable.

BACKGROUND OF THE INVENTION

A ground cable or shielded cable is generally provided with reticulated conductors which serve to ground or shield the interior of the cable. A conventional clamp for fixing such a cable includes a clamping element as well as two biasing elements which cooperate to urge the clamping element against the cable. One of the biasing elements is constituted by an electrically conductive, e.g., metallic, threaded collar while the other biasing element can be constituted by a retaining nut designed to mesh with the collar. The nut engages the clamping element along an annular interface in the region of an end face of the clamping element. The clamping element is provided with clamping fingers which, upon tightening of the nut and collar, are urged radially against the cable. In order to bias the clamping fingers radially, at least one of the clamping element, nut and collar is formed with a tapering portion, e.g., a rounded or conical portion. The clamping element is further provided with an extension which stretches away from the clamping fingers and uninsulated segments of the reticulated conductors project axially from the extension. These uninsulated segments function to establish an electrical connection.

A clamp of this character is known from the German Offenlegungsschrift 23 48 882. The clamping element is here made from sheet metal bent to the form of a ring which is open at one side. The thickness of the ring is a maximum in a central zone of the ring and decreases progressively towards the ends of the ring. A clamping zone of the ring is pressed against the surface of the cable by annular shoulders on the nut while an opposite zone is pressed against the uninsulated conductor segments via a shoulder on the collar. The pressing force thus depends essentially on the elasticity of the ring, that is, the clamping forces available for stress relief are limited. Moreover, it is not always possible to prevent the edges of the ring from damaging the cable insulation when the ring is clamped against the insulated part of the cable.

Since the ring has a certain inherent stiffness, there is also no assurance that the pressing force on either the insulated part of the cable or the uninsulated conductor segments will be uniform. Furthermore, assembly of the clamp is difficult because the clamping ring is initially loose and is fixed only after tightening of the nut and collar. Accordingly, undesired axial shifting of the clamping ring during assembly cannot be ruled out.

SUMMARY OF THE INVENTION

It is an object of the invention to provide a clamp which can be assembled relatively easily.

Another object of the invention is to provide a clamp which can be produced relatively simply.

An additional object of the invention is to provide a clamp which can generate relatively good stress relief.

A further object of the invention is to provide a clamp which is capable of gripping a cable with a relatively high degree of accuracy.

It is also an object of the invention to provide a clamp which can grip the insulated part of a cable without causing damage, or substantial damage, to the cable insulation.

Yet another object of the invention is to provide a clamp which is capable of establishing electrical contact with uninsulated conductor segments of a cable relatively rapidly.

Still a further object of the invention is to provide a clamp which can establish electrical contact with uninsulated conductor segments of a cable in a relatively simple manner.

An additional object of the invention is to provide a clamp which is capable of establishing good electrical contact with uninsulated conductor segments of a cable.

The preceding objects, as well as others which will become apparent as the description proceeds, are achieved by the invention.

One aspect of the invention resides in a clamp for an electrical cable, particularly a ground cable or a shielded cable, having uninsulated conductor segments for grounding or shielding the cable. The clamp comprises a clamping element or insert designed to at least partly embrace the cable, and the clamping element includes an insulating material and has a resilient section which is arranged to be overlapped by the conductor segments. The clamp further comprises means for urging the clamping element against the cable, and the urging means includes cooperating first and second biasing elements having an engaged position in which a selected part of the first biasing element at least partly surrounds the resilient section and the biasing elements urge the clamping element against the cable. The biasing elements further have a disengaged position in which the resilient section is free of the first biasing element. The selected part of the first biasing element has a predetermined internal cross-sectional area, and the resilient section has an external cross-sectional area such that, when the resilient section is overlapped by the conductor segments in the disengaged position of the biasing elements, the overall cross-sectional area at the resilient section in the region of overlap exceeds the predetermined internal cross-sectional area.

The clamping element can be tubular and have a substantially circular cross section. The insulating material of the clamping element may be plastic.

The clamping element may be formed with a socket-like first end portion which includes the resilient section and a second end portion provided with a plurality of clamping fingers. The second biasing element can then urge the clamping fingers against the cable in the engaged position of the biasing elements. In this position, the second biasing element can engage the second end portion of the clamping element along a substantially annular interface. The first end portion may be considered to constitute, and may be referred to as, an extension of the clamping element.

At least one of the clamping element, first biasing element and second biasing element has a tapering portion, e.g., a rounded or conical portion, which cooperates with another of these elements in the engaged position of the biasing elements to urge the clamping element against the cable.

The biasing elements have internal peripheral surfaces and the clamping element is preferably designed so that, in the engaged position of the biasing elements, at least portions of the clamping element lie against one or both such surfaces.

The first end portion or extension of the clamping element, which includes the resilient section, has an end face and, in the engaged position of the biasing elements, the clamping element may be arranged such that the uninsulated conductor segments project axially beyond the end face. The conductor segments may then be bent around the end face onto the resilient section. The conductor segments can take the form of a metallic reticulate or mesh.

The biasing elements may be substantially annular. Thus, the first biasing element can be constituted by a threaded collar while the second biasing element can be constituted by a retaining nut. The first biasing element or collar may comprise an electrically conductive material such as metal.

The invention accordingly employs proven clamping elements of plastic or similar materials. These clamping elements can, at least to a large degree, be complementary to the interiors of the biasing elements, that is, need not be loosely positioned in the clamp. Large clamping forces can be obtained with such clamping elements, i.e., good stress relief can be achieved. Moreover, manufacture is inexpensive.

After the clamping element is pushed onto the cable and the projecting conductor segments are bent onto the clamping element, the clamping element can be easily inserted in the collar together with the conductor segments. The clamping element can then assume a final position before the nut is threaded onto the collar to generate a clamping force. This enables the clamp to be assembled in a simple fashion. Due to the dimensional relationships in the region of the extension of the clamping element, i.e., the portion of the clamping element having the resilient section, the conductor segments are firmly clamped between the extension and the collar which automatically results in good electrical contact. Additional measures or special contact rings, possibly with soldered ground wires, may be avoided. Overall, a cable clamp is obtained which, as regards stress relief and ease of assembly, is comparable to cable clamps which need not establish contact with a ground or shielding reticulate. In order to press the uninsulated conductor segments against the inner surface of the metallic collar in the engaged position of the collar and the nut, it is merely necessary to provide the clamping element with an extension such as is used in conventional cable clamps to hold a seal, for example.

The resilient section of the extension is spaced somewhat from the end face of the latter. To facilitate placement of the collar on the bent conductor segments, it is advantageous for the overall cross-sectional area of the extension and overlapping conductor segments, as measured adjacent the end face of the extension, to be smaller than the internal cross-sectional area of at least that part of the collar which surrounds the resilient section in the engaged position of the collar and the nut. It is further of advantage for the overall cross-sectional area to increase progressively in a direction from the end face towards the resilient section. During the initial stages of placing the collar over the bent conductor segments, the latter are then not subjected to the radial deformation serving to press the conductor segments against the clamping element and the collar. Only when the end face of the extension and the bent portions of the conductor segments have advanced a certain distance into the collar so as to be surrounded by the latter, that is, only when lateral displacement is no longer possible, are the conductor segments radially clamped by additional advancement to thereby rapidly establish reliable electrical contact.

A particularly simple construction is achieved when the resilient section of the clamping element comprises a pressing projection, e.g., a bead or collar, on the outer side of the extension in the region of the end face thereof. The projection, which can produce or increase the resilient action or clamping force for the conductor segments, extends along at least part of the circumference of the extension, preferably along the entire circumference. If necessary, two or more such pressing projections can be arranged next to one another in axial direction of the clamping element. Upon entering the collar during assembly of the collar and the clamping element, an annular or approximately annular pressing projection extending circumferentially of the extension at the outer side and near the end face thereof can automatically press the overlying uninsulated conductor segments against the inner side of the collar to thus produce good contact.

It is particularly advantageous for the pressing projection to be integral with the extension. However, it is also possible for the pressing projection to be a separate resilient annular element or ring, e.g., an O-ring or shaped ring. Such a ring, which is preferably made of natural or synthetic rubber, can be disposed in a groove or bear against an abutment formed on the outer side of the extension. The use of a separate ring allows simpler tooling to be employed for production of the clamping element. Moreover, if necessary, clamping elements having an extension next to their clamping fingers, as considered axially of the clamping elements, can then be retrofitted with a pressing projection.

The distance between the pressing projection and the end face of the extension can be smaller than the distance between the pressing projection and those ends of the clamping fingers nearest the pressing projection. For instance, the pressing projection can be spaced from the end face of the extension by a distance approximately equal to the thickness of the material of the extension. This provides a good compromise between the quickest possible clamping of the uninsulated conductor segments upon insertion in the collar and an initial centering without the exertion of a clamping force.

To insure that the desired pressing force for the conductor segments is generated in the engaged position of the collar and the nut, the extension proper may be made resilient. This can be accomplished by providing the extension with axially extending grooves, slits or reductions in wall thickness which preferably terminate at the end face of the extension.

In addition to, or in lieu of, making the extension proper resilient, it is possible to design the pressing projection as a resilient lip or rib which protrudes radially from the outer side of the extension and can have an arcuate or conical cross section. On the one hand, this resilient construction facilitates insertion of the extension and the bent conductor segments into the collar. On the other hand, the pressing force desired for good electrical contact is reliably generated at least in the region of the pressing projection.

After insertion of the clamping element in the collar during assembly of the clamp, the uninsulated conductor segments are in good electrical contact with the clamping element and the collar. If the extension of the clamping element is now rotated relative to the collar, e.g., upon threading the nut onto the collar or tightening the nut, the conductor segments can be damaged or broken. In order to avoid this, it is advantageous for the clamping element and/or its extension to be fixed against rotation relative to the collar once the clamping element and the collar have been assembled to establish electrical contact between the conductor segments and the collar.

To prevent relative rotation of the clamping element and the collar, the clamping element can be provided with external axial ribs and the collar with complementary internal grooves. Alternatively, the clamping element may have grooves and the collar complementary ribs. The ribs are received in the grooves when the clamping element and the collar are assembled. As considered in the direction of insertion of the cable into the collar, the grooves or ribs of the collar can be located before the contact surface of the collar. In the assembled condition of the clamping element and the collar, the grooves and ribs are then disposed on that side of the pressing projection remote from the end face of the extension. By virtue of this construction, the uninsulated conductor segments will not come to lie in the grooves where they might not be pressed against the metallic collar sufficiently firmly.

Another important advantage of using plastic for the clamping element is that a circumferential annular seal can be provided at the inner side of the clamping element and clamped upon assembly. The annular seal is preferably disposed in the region of the clamping fingers. This design generates not only good electrical contact and stress relief but also good sealing of the clamp. Such sealing cannot be obtained with a clamping element of sheet metal.

Overall, the invention provides a clamp for ground cables or shielded cables which combines the advantages of good stress relief and sealing characteristics with ease of manufacture and assembly. The clamp of the invention nevertheless permits good electrical contact with the uninsulated conductor segments of the cable to be achieved without the use of additional contact rings or bushings as taught in the German publication 27 02 610.

BRIEF DESCRIPTION OF THE DRAWINGS

Other features and advantages of the invention will become apparent from the following description of preferred embodiments when read in conjunction with the accompanying drawings.

FIG. 1 is a perspective, broken away, exploded view of one embodiment of a clamp according to the invention surrounding an electrical cable to be clamped;

FIG. 2 is similar to FIG. 1 but shows the clamp is assembled condition;

FIG. 10 is similar to FIG. 8 but shows an additional embodiment of the clamping element;

FIG. 11 is similar to FIG. 8 but illustrates a further embodiment of the clamping element;

FIG. 12 is similar to FIG. 8 but shows one more embodiment of the clamping element;

FIG. 13 is similar to FIG. 8 but illustrates yet another embodiment of the clamping element;

FIG. 14 is similar to FIG. 8 but shows an additional embodiment of the clamping element;

FIG. 15 is similar to FIG. 8 but illustrates a further embodiment of the clamping element;

FIG. 16 is a broken away perspective view of another embodiment of the clamp according to the invention;

FIG. 17 is similar to FIG. 16 but shows one more embodiment of the clamp; and

FIG. 18 is similar to FIG. 16 but illustrates an additional embodiment of the clamp.

DESCRIPTION OF PREFERRED EMBODIMENTS

Figure 3:
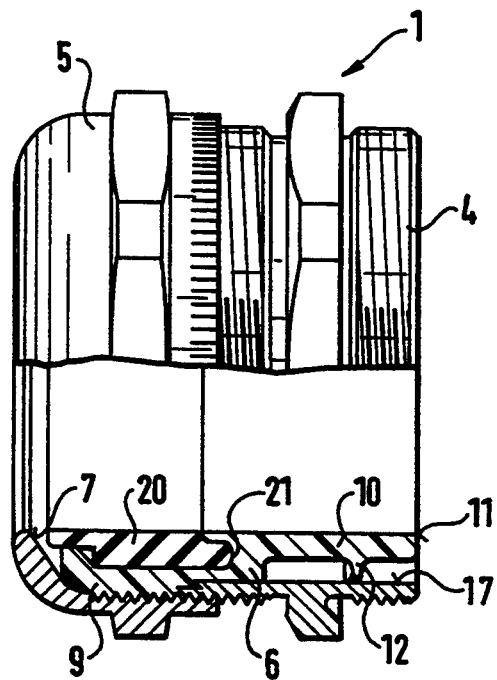
FIG. 3 is a partly sectional side view of the clamp of FIG. 1.

In the various FIGURES, corresponding elements are identified by the same reference numerals.

Considering FIGS. 1-3, the reference numeral 1 generally denotes a clamp for securely fixing and holding a ground or shielded cable 2. The cable 2 comprises a plurality of conductors which are encased in a sheath, and the conductors include metallic wires 3 which project from the sheath and define a metallic mesh for grounding or shielding the interior of the cable 2. In the vicinity of the clamp 1, the wires 3 are stripped of insulation along a short length of the cable 2. This adapts the wires 3 for good electrical contact with the clamp 1.

The clamp 1 includes a threaded clamping collar 4 of electrically conductive material, preferably metal. The clamp 1 also includes a threaded backing collar 5 which is connectible with, or can be screwed into or onto, the clamping collar 4. In FIGS. 1-6 and 16-18, the backing collar 5 is in the form of a retaining nut while, in FIG. 7, the backing collar 5 is in the form of a pressure element.

The clamp 1 further includes a clamping insert or clamping element 6 which functions to fix the cable 2 proper. As will be described below, the clamping insert 6 additionally serves to engage the uninsulated zone of the metallic mesh 3.

FIGS. 2-7 show that the backing collar 5 overlies one end face of the clamping insert 6 and contacts the clamping insert 6 in the region of the end face along a substantially annular interface 7. The backing collar 5 has a tapering portion which is conical in the FIGURES but could also be rounded. Either the clamping insert 6 or the clamping collar 4 can be provided with a tapering portion instead of the backing collar 5. It is also possible to form a tapering portion on more than one of these three elements.

The end or end portion of the clamping insert 6 in contact with the backing collar 5 is formed with axial slits 8 defining clamping fingers 9. Upon tightening the backing collar 5 and the clamping collar 4, the tapering portion of the backing collar 5 causes the clamping fingers 9, and particularly the free axial ends of the clamping fingers 9, to be radially deformed towards the cable 2. The clamping action of the clamping fingers 9 fixes the cable 2 axially in the clamp 1 and effects a stress relief of the cable 2.

The end or end portion of the clamping insert 6 opposite the clamping fingers 9 constitutes an extension of the clamping insert 6. FIG. 1 shows especially clearly that the uninsulated zone of the metallic mesh 3 projects axially beyond the extension 10. This allows an electrical connection with the uninsulated zone to be established.

The clamping insert 6 is made of an insulating material, preferably plastic. It has a substantially circular cross section and, already in the starting position, i.e., before tightening of the backing collar 5 and the clamping collar 4, bears against the inner peripheral surface of the clamping collar 4 and/or the backing collar 5. This can be seen in FIGS. 3–7, for example. The clamp 1 can thus be compactly stored and shipped and is made up of so few individual components that the assembly thereof, illustrated in FIG. 1, can be carried out very easily. The extension 10 is advantageously sleeve-like or socket-like so that it can be arranged in the clamp 1, and particularly in the clamping collar 4, coaxially and concentrically therewith. As described below, the diametral relationships are such that the extension 10 can be wedged in the clamping collar 4.

FIGS. 1 and 2 show that, in the region where the mesh 3 issues from the extension 10, the uninsulated projecting zone of the mesh 3 is bent around the end face 11, and onto the outer peripheral surface, of the extension 10. The cable 2 thus need be stripped of insulation only in the region where the clamp 1 is to be positioned and the electrical contact is to be established. After stripping of the cable 2 to create the uninsulated zone of the mesh 3, the clamping insert 6 is pushed so far onto the cable 2 that the end face 11 of the extension 10 is disposed in the vicinity of the uninsulated zone. The uninsulated zone can then be bent outwards and back opposite to its original direction to thereby come into engagement with the outer peripheral surface of the extension 10. Subsequently, the clamping collar 4 can be pushed over the bent uninsulated zone and the extension 10. Conversely, the cable 2 with the clamping insert 6 and the bent uninsulated zone can be pushed into the clamping collar 4. The backing collar 5, which was previously placed over the cable 2, can thereafter be threaded into or onto the clamping collar 4. The clamp 1 now is in the position of use or assembled condition illustrated in FIG. 2.

In the starting position, i.e., the unassembled condition of the clamp 1, the outer cross-sectional area or diameter of the extension 10 and the overlying uninsulated zone of the mesh 3, as measured at an axial spacing from the end face 11 of the extension 10, is greater than the inner cross-sectional area or diameter of at least that part of the clamping collar 4 which surrounds the extension 10 and the overlying uninsulated zone in the assembled condition of the clamp 1. In the region of overlap of the uninsulated zone, at least a section of the extension 10 is resilient radially. This can be achieved in different ways still to be described. By virtue of the resilience, the segments of the wires 3 in the uninsulated zone are pressed firmly against the inner peripheral surface of the electrically conductive clamping collar 4 upon insertion of the extension 10 and the overlapping uninsulated zone in the clamping collar 4. Thus, electrical contact with the metallic grounding or shielding mesh is established merely by assembling the clamp 1. Contact rings and additional collars, as well as soldering of a ground conductor, are not required.

To facilitate assembly of the clamping collar 4 with the extension 10 and its overlapping uninsulated zone, the outer cross-sectional area or diameter of the overlapped extension 10 adjacent the end face 11 of the extension 10 is smaller than the inner cross-sectional area or diameter of the clamping collar 4. This allows the overlapped extension 10 to penetrate the interior of the clamping collar 4 without the exertion of a radial pressing force. The outer cross-sectional area of the overlapped extension 10 at an axial spacing from the end face 11 is greater than that adjacent the latter and, as already mentioned, exceeds the inner cross-sectional area of at least that part of the clamping collar 4 which surrounds the overlapped extension 10 in the assembled condition of the clamp 1.

The increase in cross-sectional area away from the end face 11 can take place gradually or progressively. Instead of increasing the outer cross-sectional area of the overlapped extension 10, it is possible to design the clamping collar 4 so that the internal cross-sectional area thereof decreases.

As indicated earlier, at least a section of the extension 10 is resilient radially. The resilient section is advantageously constituted by a pressing projection 12 on the outer peripheral surface of the extension 10 near the end face 11. The projection 12 extends over at least part of the circumference, preferably the entire circumference, of the extension 10 and produces or increases the resilient action or pressing force for the uninsulated wire segments. The projection 12, which is favorably in the form of a substantially circumferentially complete ring, can have different cross-sectional configurations. As outlined below, the projection 12 can be in the form of a collar, a bead or a lip.

Figure 6:
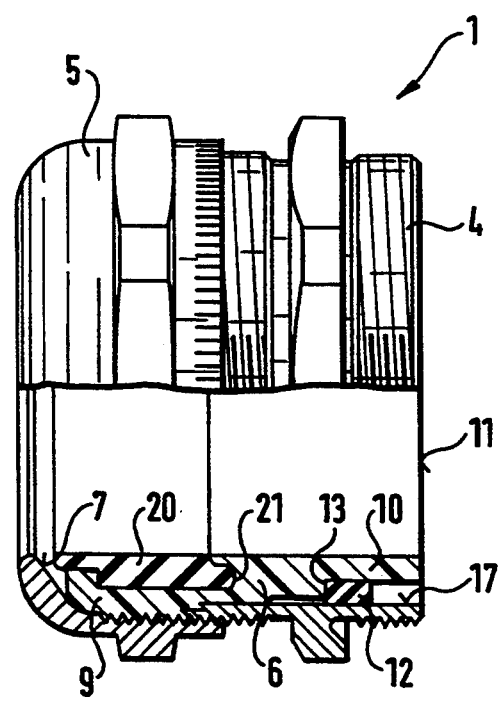
FIG. 6 is similar to FIG. 3 but illustrates one more embodiment of the clamp.
Figure 7:
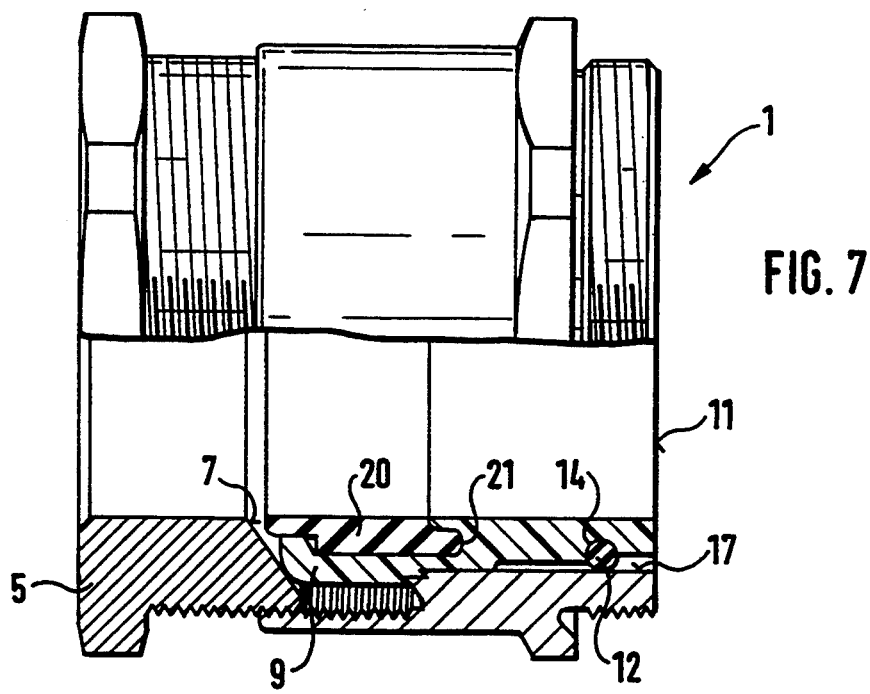
FIG. 7 is similar to FIG. 3 but shows yet another embodiment of the clamp.

In FIGS. 1–4, 8–11, 13 and 16, the projection 12 is integral with the outer peripheral surface of the extension 10. Here, the projection 12 does not constitute an additional component but can be fashioned on the extension 10 during production of the clamping insert 6. On the other hand, in FIGS. 5–7, 12, 14, 15, 17 and 18, the projection 12 is a separate ring of resilient material, particularly natural or synthetic rubber, disposed on the outer peripheral surface of the extension 10. For instance, the projection 12 can be an O-ring as shown in FIGS. 5, 7, 14, 15, 17 and 18 or a shaped ring, e.g., a ring of rectangular cross section, as illustrated in FIGS. 6 and 12. According to FIGS. 6, 12 and 14, a projection 12 designed as an independent ring can bear axially against an abutment 13 on the outer side of the extension 10. The abutment 13 is located on that side of the annular projection 12 which faces away from the end face of the extension 10. As illustrated in FIGS. 5, 7, 15 and 17, it is also possible and advantageous for a projection 12 in the form of a separate ring to be arranged in a groove 14 which fixes the projection 12 axially of the clamping insert 6.

The projection 12 provides a desired resilience radially inwards. When the projection 12 is compressed, this resilience acts radially outwards to create a pressing force for urging the bent uninsulated zone of the mesh 3 against the internal peripheral surface of the clamping collar 4.

The spacing of the projection 12 from the end face 11 of the extension can vary. Advantageously, this spacing is relatively small. For example, the distance between the end face 11 and the projection 12 can approximate or equal the wall thickness of the extension 10 as shown in FIGS. 15 and 18. This allows shorter uninsulated segments of the wires 3 to be gripped reliably and pressed against the inner peripheral surface of the clamping collar 4.

Figure 8:
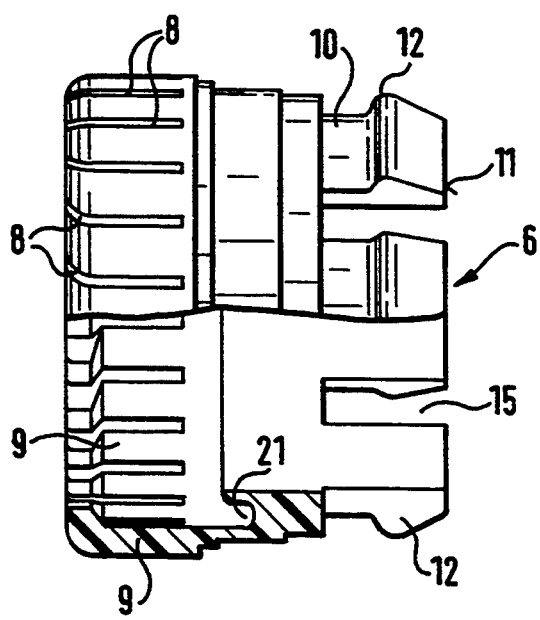
FIG. 8 is a side view of one embodiment of a clamping element constituting part of a clamp in accordance with the invention.

In FIG. 8, the projection 12 includes a conical transition portion between the end face 11 of the extension 10 and the area of largest diameter of the projection 12. In other words, the projection 12 begins adjacent the end face 11 with an area of smaller diameter and expands continuously to its area of maximum diameter. To compensate for the increase in diameter, the extension 10 is made radially resilient by providing it with cutouts 15 which open to or terminate at the end face 11. Additional clamping of the cable 2 can be achieved in this region of the extension 10 because the sections of the extension 10 between the cutouts 15 can be deformed radially inward somewhat, and thus pressed against the surface of the cable 2, when the clamping collar 4 is pushed onto the extension 10.

Figure 4:
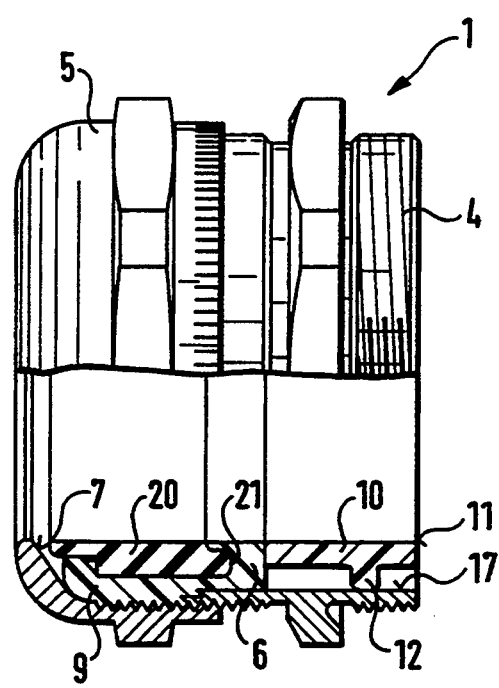
FIG. 4 is similar to FIG. 3 but illustrates a further embodiment of the clamp.
Figure 5:
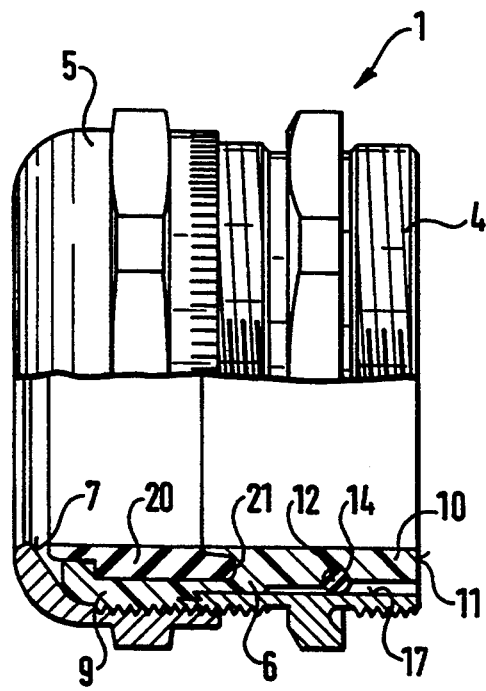
FIG. 5 is similar to FIG. 3 but shows another embodiment of he clamp.

In FIGS. 4, 10, 11 and 16, the extension 10 itself is also resilient. FIGS. 4 and 10 show that this can be accomplished by forming the extension 10 with axially extending regions 15 of reduced wall thickness. Only a thin wall 16 remains in these regions. On the other hand, as illustrated in FIGS. 11 and 16, the extension 10 can be made resilient by providing the latter with axial slits 15. The regions 15 of reduced wall thickness, as well as the slits 15, open to or terminate at the end face 11 of the extension 10.

In FIG. 14, the extension 10 is likewise provided with axial slits 15. However, the number of slits 15 in FIG. 14 exceeds that in either FIG. 11 or FIG. 16. FIGS. 11, 14 and 16 indicate that the number and width of the slits 15 can vary.

Due to the slits and reductions in wall thickness 15, the projection 12 in FIGS. 8, 10 and 11 is circumferentially incomplete because the slits and reductions in wall thickness 15 extend through and interrupt the projection 12. Nevertheless, the remaining segments of the projection 12 are sufficiently wide to clamp the uninsulated segments of the wires 3 between the clamping collar 4 and the extension 10 with its projection 12 and to achieve good electrical contact with the contact surface 17 of the clamping collar 4.

Figure 9:
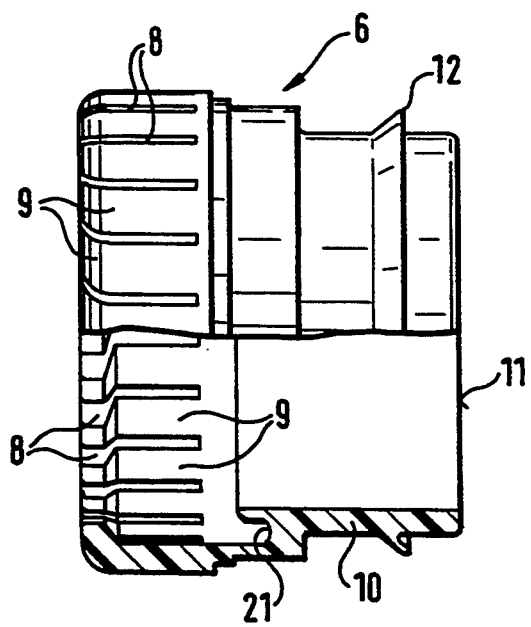
FIG. 9 is similar to FIG. 8 but illustrates another embodiment of the clamping element.

In FIGS. 1-3, 9, 10, 13 and 16, the radial flexibility of the projection 12 is obtained in that the projection 12 is designed as a resilient lip. The resilient lip 12 of FIGS. 1-3 and 13 protrudes straight outwards radially from the outer peripheral surface of the extension 10 while the resilient lip 12 of FIGS. 9, 10 and 16 is rounded or conical. When the uninsulated zone of the metallic mesh 3 is bent over the lip-like projection 12 and the clamping insert 6 is assembled with the clamping collar 4, elastic deformation of the projection 12 occurs. This results in the desired radial yielding and the creation of the pressing force for establishing electrical contact with the contact surface 17 of the clamping collar 4.

In FIGS. 10 and 16, the resilient action of the projection 12 is enhanced by the extension 10 because the latter is provided with axial slits 15 and is thus resilient itself.

Referring to FIGS. 13 and 16-18, the clamping insert 6 and its extension 10 are prevented from rotating relative to the clamping collar 4 when assembled therewith. Thus, after assembly, the clamping collar 4 and the extension 10 are coupled to one another so as to prevent relative movement circumferentially while permitting relative shifting axially. To this end, the extension 10 is provided with ribs 18 and the inner peripheral surface of the clamping collar 4 is formed with complementary grooves 19. It is also possible to provide the inner peripheral surface of the clamping collar 4 with ribs and to form the complementary grooves in the extension 10. The ribs 18, which extend axially over a short length of the extension 10, can be located between the projection 12 and the end face 11 of the extension 10 as shown in FIGS. 13, 16 and 17. Advantageously, however, the ribs 18 are disposed on that side of the projection 12 which faces away from the end face 11 as illustrated in FIG. 18. This prevents the uninsulated segments of the wires 3 from coming to rest in the grooves 19 of the clamping collar 4 and thereby affecting the connection between the latter and the extension 10.

The inner peripheral surface of the clamping insert 6 is provided with a circumferential, sleeve-like annular seal 20 in the vicinity of the clamping fingers 9. Accordingly, the clamp 1 is not only capable of establishing the desired electrical contact with the uninsulated segments of the wires 3 in a simple manner but can be used as a sealed cable clamp. This is so because the clamping insert 6 consists of plastic and can be provided with depressions as well as an undercut 21 for holding the seal 20. Such a construction cannot be achieved at reasonable cost for a sheet metal clamping insert.

In summary, the clamp 1 for the ground or shielded cable 2 has a threaded clamping collar 4 of electrically conductive material,. e.g., metal, and a threaded backing collar 5 which is connectible therewith. The backing collar 5 can be in the form of a pressure element or a retaining nut. A clamping insert 6 which can be pressed against the cable 2 by screwing the backing collar 5 into or onto the clamping collar 4 serves to fix the cable 2. The backing collar 5 contacts the clamping insert 6 along a substantially annular interface 7, and overlies the clamping insert 6, at least in the region of one end face of the clamping insert 6. The clamping insert 6 has axial slits 8 which define clamping fingers 9, and the clamping fingers 9 are deformed radially towards the cable 2 by a tapering, e.g., conical, portion of the backing collar 5 upon tightening of the clamping collar 4 and the backing collar 5. The clamping fingers 9 are located on one end portion of the clamping insert 6 and the clamping insert 6 has an opposed end portion which constitutes an extension 10 of the clamping insert 6. The cable 2 includes a metallic mesh 3 for grounding or shielding the interior of the cable 2 and the mesh 3 has an uninsulated zone which projects axially beyond the extension 10 when the clamping insert 6 is positioned on the cable 2. The clamping insert 6, which consists of an insulating material such as plastic, has an approximately circular cross section when the clamp 1 is assembled, the extension 10 projects into the clamping collar 4 and fits snugly in the interior thereof. The extension 10 is sleeve-like or socket-like and the projecting uninsulated zone of the mesh is bent back onto the outer peripheral surface of the extension 10. The extension 10 has a resilient section 12 in the region of overlap which is surrounded by part of the clamping collar 4 in the assembled condition of the clamp 1. In the unassembled condition of the clamp 1, the outer cross-sectional area of the extension 10 and the overlapping uninsulated zone exceeds the internal cross-sectional area of this part of the clamping collar 4. Thus, when the overlapped extension 10 is inserted in the clamping collar 4, the uninsulated zone is firmly pressed against an internal contact surface 17 of the clamping collar 4.

A ground connection for the metallic mesh 3 is thus readily established via the clamping collar 4 and its connecting threads.

Various modifications can be made within the meaning and range of equivalence of the appended claims.

I claim:

1. A clamp for an electrical cable having uninsulated conductor segments for grounding or shielding the cable, said clamp comprising:

a clamping element having first and second ends designed to at least partly embrace the cable, said clamping element being formed from an insulating material and having a resilient section which is arranged to be overlapped by conductor segments overlapped over said first end of said clamping element; and means for urging said clamping element against the cable, including cooperating first and second biasing elements for respectively positioning around said first and second ends of said clamping element, one of said biasing elements having an internal contact surface for contacting a portion of said clamping element; wherein:

said means for urging is in an engaged position when said internal contact surface contacts said resilient section and the conductor segments, and when said biasing elements urge said clamping element against the cable;

said means for urging is in a disengaged position when said internal contact surface does not contact said resilient section; and said internal contact surface has an internal cross-sectional area, and said resilient section has an external cross-sectional area such that, when said resilient section is overlapped by the conductor segments and said means for urging is in said disengaged position, the external cross-sectional area of said resilient section is increased by the conductor segments to exceed said internal cross-sectional area of said internal contact surface.

2. The clamp of claim 1, wherein said material from which said clamping element is formed comprises plastic.

3. The clamp of claim 1, wherein said clamping element is tubular and has a substantially circular cross section.

4. The clamp of claim 1, wherein said first end of said clamping element is socket-like and includes said resilient section and said second end of said clamping element is provided with a plurality of clamping fingers, said internal contact surface being positioned on said first biasing element and said second biasing element urging said fingers against the cable when said means for urging is in said engaged position.

5. The clamp of claim 4, wherein said second biasing element has a substantially annular interface for engaging said second end of said clamping member when said means for urging is in said engaged position.

6. The clamp of claim 1, wherein at least one of said biasing elements has a tapering portion which cooperates with said clamping element when said means for urging is in said engaged position to urge said clamping element against the cable.

7. The clamp of claim 6, wherein said tapering portion is conical or rounded.

8. The clamp of claim 1, wherein said first biasing element comprises an electrically conductive material.

9. The clamp of claim 1, wherein said biasing elements are substantially annular.

10. The clamp of claim 1, wherein said resilient section is positioned at said first end of said clamping element, said first end of said clamping element further including an end face and an outer peripheral surface which is disposed between said end face and said resilient section and over which the conductor segments are overlapped, said outer peripheral surface having an outer cross-sectional area such that, when said outer peripheral surface is overlapped by the conductor segments when said means for urging is in said disengaged position, the outer cross-sectional area of said outer peripheral surface, as increased by the conductor segments, is smaller than said internal cross-sectional area of said internal contact surface.

11. The clamp of claim 10, wherein said outer cross-sectional area of said outer peripheral surface increases progressively from said end face to said resilient section.

12. The clamp of claim 1, wherein said resilient section is positioned at said first end of said clamping element and includes a circumferentially extending external projection.

13. The clamp of claim 12, wherein said projection is substantially circumferentially complete.

14. The clamp of claim 12, wherein said projection is integral with said first end of said clamping element.

15. The clamp of claim 12, wherein said projection comprises a generally annular element which is discrete from said first end of said clamping element.

16. The clamp of claim 15, wherein said first end of said clamping element is provided with a circumferentially extending groove and said annular element is located in said groove.

17. The clamp of claim 15, wherein said first end of said clamping element is provided with an abutment and said annular element bears against said abutment.

18. The clamp of claim 15, wherein said annular element comprises an O-ring or shaped ring.

19. The clamp of claim 15, wherein said annular element comprises a resilient substance.

20. The clamp of claim 19, wherein said substance is natural or synthetic rubber.

21. The clamp of claim 12, wherein said first end of said clamping element has an end face and said second end of said clamping element has a plurality of clamping fingers, said clamping fingers having free ends, and attachment ends between said free ends and said projection and joined to said first end of said clamping element, said projection being closer to said end face than to said attachment ends.

22. The clamp of claim 12, wherein said first end of said clamping element has an end face and a predetermined thickness, said projection being spaced from said end face by a distance approximately equal to said predetermined thickness.

23. The clamp of claim 12, wherein said projection comprises a resilient rib.

24. The clamp of claim 23, wherein said rib is arcuate or substantially conical.

25. The clamp of claim 1, wherein said first end of said clamping element includes said resilient section, said first end of said clamping element being weakened in selected areas to thereby increase the resilience of said first end of said clamping element.

26. The clamp of claim 25, wherein said first end of said clamping element is provided with grooves or slits, or has reduced thickness, in said weakened areas.

27. The clamp of claim 25, wherein said first end of said clamping element has an end face and said weakened areas terminate at said end face.

28. The clamp of claim 1, comprising means for preventing rotation of at least said resilient section of said clamping element relative to said first biasing element.

29. The clamp of claim 28, wherein said clamping element and said first biasing element are provided with cooperating coupling portions which at least partly constitute said preventing means.

30. The clamp of claim 29, wherein said coupling portions comprise ribs on one of said clamping element and said first biasing element and complementary grooves in the other of said clamping element and said first biasing element.

31. The clamp of claim 28, wherein said clamping element has an end portion with an end face, said end portion including said resilient section, and said resilient section being located between said end face and said preventing means.

32. The clamp of claim 1, wherein said clamping element has an internal peripheral surface, said internal peripheral surface being provided with a circumferentially extending sealing element.

33. The clamp of claim 32, wherein said sealing element is substantially annular.

34. The clamp of claim 32, wherein said clamping element is provided with a plurality of clamping fingers at said first end of said clamping element, said sealing element being disposed in the region of said clamping fingers.

35. The clamp of claim 32, wherein said clamping element is provided with an undercut for receiving and holding said sealing element.

36. An electrical cable with a grounding or shielding clamp comprising:

a sheath positioned around said cable;

a plurality of conductors held by said sheath, said conductors including uninsulated conductor segments projecting from said sheath for grounding or shielding the interior of said sheath;

a clamping element which at least partly embraces said sheath, said clamping element being formed from an insulating material, and having an end portion which includes a resilient section and an end face, said conductor segments being bent around said end face so that selected sections of said conductor segments overlie said resilient section; and means for urging said clamping element against said sheath, said urging means including cooperating first and second biasing elements for positioning around said clamping element, one of said biasing elements having an internal contact surface for contacting a portion of said clamping element; wherein:

said means for urging is in an engaged position when said internal contact surface contacts said selected sections of said conductor elements overlying said resilient section and when said biasing elements urge said clamping element against said sheath;

said means for urging is in a disengaged position when said internal contact surface is not in contact with said selected sections of said conductor elements; and said internal contact surface has an internal cross-sectional area, and said selected sections of said conductor elements have an external cross-sectional area, when said means for urging is in said disengaged position, which exceeds said internal cross-sectional area.

* * * * *